United States Patent Office 3,565,948
Patented Feb. 23, 1971

3,565,948
2-KETO-6β-HALO-7α-HYDROXY-A-NORANDROSTENES
Patrick A. Diassi, Westfield, N.J., assignor to E. R. Squibb & Sons, Inc., New York, N.Y., a corporation of Delaware
No Drawing. Continuation-in-part of application Ser. No. 736,029, June 11, 1968, which is a continuation-in-part of application Ser. No. 370,355, May 26, 1964. This application Mar. 4, 1970, Ser. No. 16,555
Int. Cl. C07c 69/14, 69/52, 69/74
U.S. Cl. 260—488                                    8 Claims

ABSTRACT OF THE DISCLOSURE

2 - keto-6β-halo-7α-hydroxy-A-norandrostenes are prepared from the corresponding 6α,7α-oxido compounds by treating the latter with a hydrogen halide. The compounds are useful as intermediates in the preparation of 2-keto-6-halo-$\Delta^6$-androstenes.

---

This application is a continuation-in-part application of my copending application Ser. No. 736,029, filed June 11, 1968, now abandoned which application in turn was a continuation-in-part of copending application Ser. No. 370,355, filed May 26, 1964, now Pat. No. 3,426,045, granted Feb. 4, 1969.

More particularly, this invention relates to steroids of the formula

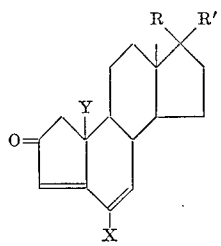

wherein Y is hydrogen or lower alkyl (e.g., methyl); X is halogen, (e.g., chloro or bromo); R is selected from the group consisting of hydroxy and acyloxy (e.g., acetic acid, caproic acid and enanthic acid); R' is selected from the group consisting of hydrogen and lower alkyl (e.g., methyl and ethyl); and together R and R' is oxo (O=).

The preferred acyl radicals of this invention are those of hydrocarbon carboxylic acids of less than ten carbon atoms as exemplified by such acids as the lower alkanoic acids, the lower alkenoic acids, the monocyclic aryl carboxylic acids, the monocyclic aryl lower alkanoic acids (e.g., phenacetic and phenylpropionic acids), the cycloalkane carboxylic acids, and the cycloalkene carboxylic acids.

The compounds of this invention may be prepared according to the processes of this invention, beginning with A-nortestosterone and its 17-substituted derivatives. The A-nortestosterone starting materials may be prepared according to the procedures set forth in prior applications, Ser. No. 684,787, filed Sept. 24, 1957, in the name of Frank L. Weisenborn and Ser. No. 766,363, filed Oct. 9, 1958, in the name of Frank L. Weisenborn.

The starting material may be first treated with a halogenating agent, for example, 2,3 - dichloro-5,6-dicyanobenzoquinone and a hydrogen halide, for example, hydrogen chloride or hydrogen bromide to yield the 7-halo derivative of the respective starting material, which are new compounds of this invention.

The 7-halo derivatives may then be dehydrogenated, as by treatment with an organic base, for example, collidine, at elevated temperatures, to yield the 6-dehydro derivatives of the respective starting materials, which are also new compounds of this invention.

The 6-dehydro derivatives may then be oxidized as by treatment with a perbenzoic acid, for example, m-chloroperbenzoic acid, to yield the 6α,7α-oxido derivatives of the respective starting materials, also new compounds of the instant invention.

The 6α,7α-oxido derivatives may then be treated with an excess of a hydrohalide, e.g., hydrogen chloride or hydrogen bromide, at an elevated temperature to yield directly, the respective 6-halo-6-dehydro final products of this invention.

Alternatively, the 6-halo-6-dehydro final products may be prepared by first treating the 6α,7α-oxido derivatives with one molar equivalent of a hydrohalide, e.g., hydrogen chloride or hydrogen bromide, at reduced temperatures, to yield the 6-halo-7-hydroxy derivatives, which are new compounds of this invention. These 6-halo-7-hydroxy derivatives may then be treated with an excess of hydrogen halide, at an elevated temperature to yield the 6-halo-6-dehydro final products of this invention.

The compounds of this invention may be utilized in various ways including in admixture with a suitable carrier or carriers. The compounds of this invention possess anabolic activity and hence may be used in place of such known anabolic steroids as 17-ethyl-19-nortestosterone in the treatment of post-operative shock and other conditions where tissue degeneration has occurred. Administration of the products of this invention may be accomplished either perorally or parenterally, the dosage and/or concentration being adjusted for the relative potency of the particular steroid.

The invention may be further illustrated by the following examples:

EXAMPLE 1

7α-chloro-A-nortestosterone

To a solution of 176 mg. of A-nortestosterone in 6.4 ml. of dried dioxane 160 mg. of 2,3-dichloro-5,6-dicyanobenzoquinone are added into the resulting solution a stream of hydrogen chloride gas is bubbled for thirty seconds. The reaction mixture is then left at room temperature for sixteen hours during which time crystals of 2,3-dichloro-5,6-dicyanohydroquinone separate. The mixture is then filtered, washed with dioxane and the filtrate evaporated to dryness, in vacuo. The residue is dissolved in chloroform and plate chromatographed using Woelm neutral alumina (Activity 5) as adsorbant and chloroform as developing solvent. Detection of the band having Rf approximately 0.6 and elution with ethyl acetate followed by evaporation of the solvent, in vacuo, gives a residue which on crystallization from aceton-hexane yields 50 mg. of 7α-chloro-A-nortestosterone having a melting point of 212–214° C., $[\alpha]_D^{22}$ —33.7° (chloroform).

$\lambda_{max.}^{alc}$ 232 mµ ($\epsilon$, 16,400)

*Analysis.*—Calc'd for $C_{18}H_{25}O_2Cl$ (308.84) (percent): C, 70.00; H, 8.16; Cl, 11.48. Found (percent): C, 70.65; H, 8.39; Cl, 12.00.

Similarly, following the above procedure but substituting equivalent amounts of 17α-methyl-A-nortestosterone; 17α-ethyl-A-nortestosterone; A,19-bisnortestosterone; 17α-methyl - A - nortestosterone; 17α-ethyl-A,19-bisnortestosterone, the 17-ester of these compounds, for example A-nortestosterone, 17-acetate, 17α-methyl-A-nortestosterone 17β-acetate; A,19-bisnortestosterone 17β-acetate and other like esters; A-nor-$\Delta^3$-androstene-2,17-dione; and A,19-bisnor-$\Delta^3$-androstene-2,17-dione for A-nortestosterone, there is obtained the respective 7α-chloro derivative thereof.

EXAMPLE 2

7-α-bromo-A-nortestosterone

Following the procedure of Example 1 but substituting hydrogen bromide for hydrogen chloride there is obtained 7α-bromo-A-nortestosterone.

EXAMPLE 3

6-dehydro-A-nortestosterone

A solution of 183.8 mg. of 7α-chloro-A-nortestosterone in 5 ml. of collidine is refluxed for one hour. After cooling it is diluted with chloroform and washed successively with 2 N hydrochloric acid, water, 5% sodium bicarbonate and water, then evaporated to dryness, in vacuo. The residue on plate chromatography using Woelm neutral alumina (Activity V) and chloroform as developing solvent gives a band detectable by ultraviolet at Rf approximately .7 which on elution with ethyl acetate, evaporation of the solvent, in vacuo. Crystallization of the residue from acetone-hexane yields 6-dehydro-A-nortestosterone having melting point 219–221° C., $[\alpha]_D^{22}+63.3°$ (chloroform), $$\lambda_{max.}^{alc} \ 276 \ m\mu \ (\epsilon, 23,000)$$

*Analysis.*—Calc'd for $C_{18}H_{24}O_2$ (272.37) (percent): C, 79.37; H, 8.88. Found (percent): C, 79.46; H, 8.96.

Similarly, the 7α-chloro derivatives prepared in Example 1 may also be treated by the above procedure to yield the respective 6-dehydro derivatives.

EXAMPLE 4

6α,7α-oxido-A-nortestosterone

A solution of 225 mg. of 6-dehydro-A-nortestosterone in 25 ml. of methylene chloride is cooled to 0° C. and 450 mg. of metachloroperbenzoic acid is added in small portions. The reaction mixture is kept at 0° C. for thirty minutes then allowed to come to room temperature and left stirring for sixty-four hours. The solution is then washed with 5% solution bicarbonate, 5% sodium sulfite, and water and then evaporated to dryness in vacuo. The residue on plate chromatography using Woelm neutral alumina (Activity V) as adsorbant and chloroform as developing solvent gives a major band at Rf 0.5 which is detectable by ultraviolet and is eluted with ethyl acetate. The ethyl acetate is evaporated to dryness in vacuo to give a residue which on crystallization from acetone-hexane gives 120 mg. of 6α,7α-oxido-A-nortestosterone having melting point 172–174° C., $[\alpha]_D^{22}+8.5°$ (chloroform), $$\lambda_{max.}^{alc} \ 234 \ m\mu \ (\epsilon, 13,500)$$

*Analysis.*—Calc'd for $C_{18}H_{24}O_3$ (percent): C, 74.97; H, 8.39. Found (percent): C, 74.80; H, 8.25.

Similarly, the other 6-dehydro derivatives prepared according to Example 3 may also be treated by the above procedure to yield the respective 6α,7α-oxido derivatives.

EXAMPLE 5

6β-chloro-7α-hydroxy-A-nortestosterone

To a cold solution of 100 mg. (0.348 mmole) of 6α,7α-oxido-A-nortestosterone in 10 ml. of chloroform is added dropwise 0.93 ml. of a solution of hydrogen chloride in chloroform containing 50 mg. of hydrochloric acid per ml. The resulting solution is kept at 0° for 2½ hours then diluted with water. The chloroform is separated and the aqueous portion extracted with chloroform. The combined chloroform extracts are then washed with water until neutral and evaporated to dryness in vacuo. Crystallization of the residue from acetone-hexane gives 87 mg. of 6β-chloro-7α-hydroxy-A-nortestosterone having melting point of 212–214° C., $[\alpha]_D^{22}-52.7°$ (ethanol), $$\lambda_{max.}^{alc} \ 234 \ m\mu \ (\epsilon, 13,400)$$

*Analysis.*—Calc'd for $C_{18}H_{25}O_3Cl$ (percent): C, 66.56; H, 7.76; Cl, 10.9. Found (percent): C, 66.50; H, 7.73; Cl, 10.82.

Similarly, the other 6α,7α-oxido derivatives obtained in Example 4 may be treated in accordance with the above procedure to yield the respective 6β-chloro-7α-hydroxy derivatives.

EXAMPLE 6

6β-bromo-7α-hydroxy-A-nortestosterone

Following the procedure of Example 5 however substituting hydrogen bromide in acetic acid for the hydrogen chloride in the chloroform there is obtained 6β-bromo-7α-hydroxy-A-nortestosterone.

EXAMPLE 7

6-chloro-6-dehydro-A-nortestosterone

A solution of 36 mg. of 6β-chloro-7α-hydroxy-A-nortestosterone in 5 ml. of chloroform is saturated with hydrogen chloride gas and the mixture heated at 40–45° C. for twenty-two hours. The solution is washed with 5% sodium bicarbonate with water until neutral and then evaporated to dryness, in vacuo. Chromatography of the residue on Woelm neutral alumina (Activity V) using ethyl acetate chloroform (1:9, v.:v.) as eluting solvent gives on evaporation and crystallization of the residue 11 mg. of 6-chloro-6-dehydro-A-nortestosterone having melting point 164–166° C., $[\alpha]_D+47.9°$ C. (chloroform), $$\lambda_{max.}^{alc} \ 279 \ m\mu \ (\epsilon, 21,000)$$

*Analysis.*—Calc'd for $C_{18}H_{23}O_2Cl$ (306.82) (percent): C, 70.45; H, 7.83. Found (percent): C, 71.00; H, 7.30.

Similarly, the other 6β-chloro-7α-hydroxy derivatives obtained in Example 5 may be treated in accordance with the above procedure to yield the respective 6-chloro-6-dehydro derivatives.

EXAMPLE 8

6-bromo-6-dehydro-A-nortestosterone

Following the procedure of Example 7 but substituting hydrogen bromide for the hydrogen chloride there is obtained 6-bromo-6-dehydro-A-nortestosterone.

EXAMPLE 9

6-chloro-6-dehydro-A-nortestosterone

Following the procedure set forth in Example 7, but substituting an equivalent amount of 6α,7α-oxido-A-nortestosterone for 6β-chloro-7α-hydroxy-A-nortestosterone, there is obtained 6-chloro-6-dehydro-A-nortestosterone.

EXAMPLE 10

Following the procedures of Examples 1, 3, 4 and 5 but substituting the acetic acid ester of A-nortestosterone for A-nortestosterone of Example 1, there is obtained the acetic acid ester of 6β-chloro-7α-hydroxy-A-nortestosterone.

EXAMPLE 11

Following the procedures of Examples 1, 3, 4, and 5 but substituting the caproic acid ester of A-nortestosterone for the A-nortestosterone of Example 1, there is obtained the caproic acid ester of 6β-chloro-7α-hydroxy-A-nortestosterone.

EXAMPLE 12

Following the procedures of Examples 1, 3, 4, and 5 but substituting the enanthic acid ester of A-nortestosterone for A-nortestosterone of Example 1, there is obtained the enanthic acid ester of 6β-chloro-7α-hydroxy-A-nortestosterone.

EXAMPLES 13–16

Following the procedures of Examples 2, 3, 4, and 5 but substituting the acetate, caproate and enanthate esters, respectively, for A-nortestosterone, there is obtained, respectively, the corresponding acetate, caproate and enanthate esters of 6β-bromo-7α-hydroxy-A-nortestosterone.

What is claimed is:
1. A compound of the formula

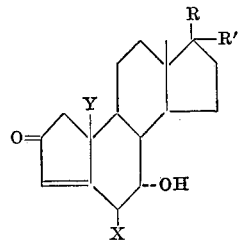

wherein X is halogen; Y is hydrogen or lower alkyl; R is hydroxy or the acyloxy group of a hydrocarbon carboxylic acid of less than ten carbon atoms; R' is hydrogen or lower alkyl; and together R and R' is oxo.

2. A compound in accordance with claim 1 wherein Y is methyl.

3. A compound in accordance with claim 1 wherein R is the acyloxy group of acetic acid, caproic acid or enanthic acid.

4. A compound in accordance with claim 1 wherein R' is methyl or ethyl.

5. A compound in accordance with claim 1 having the name 6β-chloro-7α-hydroxy-A-nortestosterone.

6. A compound in accordance with claim 1 having the name 6β-bromo-7α-hydroxy-A-nortestosterone.

7. A compound in accordance with claim 3 wherein X is chlorine.

8. A compound in accordance with claim 3 wherein X is bromine.

References Cited
UNITED STATES PATENTS
2,228,577   1/1941   Marker _____ 260—586

OTHER REFERENCES
Bruckner: Chem. Ber., 1961, pp. 1237–38.

LORRAINE A. WEINBERGER, Primary Examiner
V. GARNER, Assistant Examiner

U.S. Cl. X.R.
260—348, 410, 468, 476, 486, 586, 999